3,376,240
MOLD BOND RELEASE COATING OF PVA
AND LIGNITIC SULPHITE WASTE
Robert W. Childers, Tulsa, Okla., and Richard K. Snow, Westwood, N.J., assignors to Raymond International Inc., New York, N.Y., a corporation of New Jersey
Continuation-in-part of application Ser. No. 429,018, Jan. 29, 1965. This application Nov. 17, 1966, Ser. No. 602,440
9 Claims. (Cl. 260—17.5)

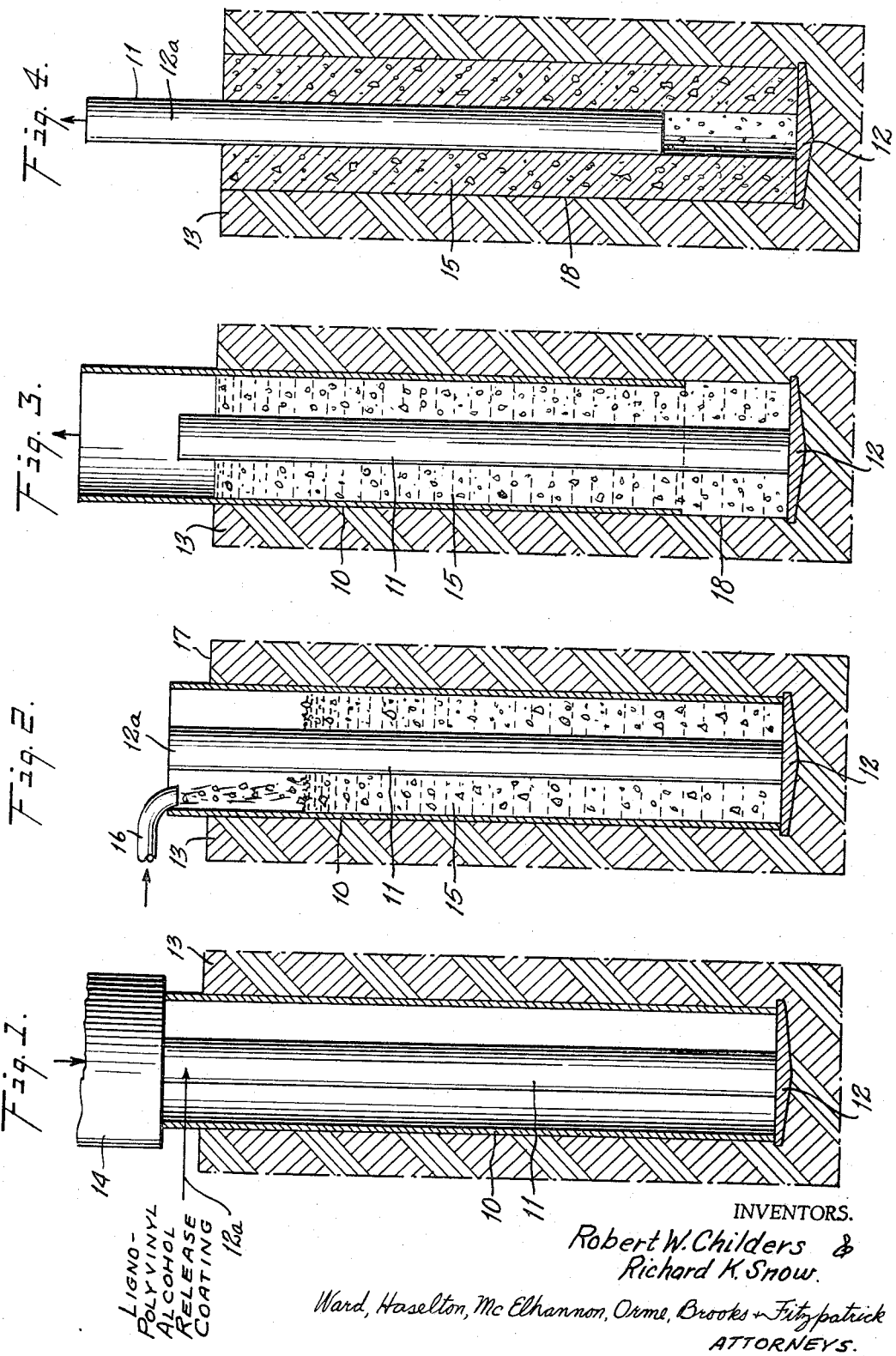

ABSTRACT OF THE DISCLOSURE

The following specification describes a composition made up of lignitic waste material, polyvinyl alcohol, and water in special proportions for use as a concrete to mold release coating. The specification also describes a method of forming textured concrete surfaces by the use of the coating to retard surface curing followed by surface washing.

The foregoing "Abstract of the Disclosure" is solely for the purpose of enabling the Patent Office and the public generally to determine quickly from a cursory inspection the nature and gist of the technical disclosure, and the abstract shall not be used for interpreting the scope of the claims.

This application is a continuation-in-part of a copending application Ser. No. 429,018, filed Jan. 29, 1965, which in turn is a division of a copending application Ser. No. 193,180, filed May 8, 1962 now U.S. Patent No. 3,198,857.

This invention pertains to the treatment of concrete molding forms of wood, plastic, metal or other suitable material, and particularly metal molding forms which are designed for repeated reuse in the production of cast-in-place concrete shapes, and has for its object the elimination or minimization of adherence between the molding form and the concrete after the latter has set to permit removal of the form.

The invention has for its objects the provision of a novel coating composition and method of treating such forms, for achieving substantial freedom from adherence of the molding shape to the concrete on setting, with resultant smoothness and freedom from flaws of the finished concrete shape and with no impairment chemically or structurally of the concrete surface.

When liquid concrete is poured within, about or against a molding form for imparting a desired shape, considerable difficulty is encountered in removing the mold form after the concrete has set, due to sticking or adherence of the solidified concrete to the mold surface engaging the same. In an effort to eliminate this difficulty, it has heretofore been proposed to precoat the mold surface against which the concrete is cast, with various coating compositions such as mineral oils of various types and viscosities, water-in-oil emulsions and other oleaginous substances immiscible with water; also with various metal or organic salts of both inorganic and organic acids, and various complex organic compounds or complexes, none of which, however, has effectively solved this problem.

What might be termed the "acid test" as to the effectiveness of a release coating composition for purposes aforesaid, is encountered in the formation in the ground of cast-in-place tubular concrete pile shells. Such shells are conventionally placed by driving into the ground to a desired depth of penetration, a tubular metal casing assembled on a booth plate or driving point. After the driving is complete or prior thereto if desired, a closed cylindrical metal form or mandrel of substantially smaller diameter than the casing is concentrically inserted therein until it rests upon the booth plate, and the annular space between the casing and mandrel filled with liquid concrete. The outer casing is then withdrawn before the concrete has set so that no serious problems of adherence of the concrete to the casing are encountered. The mandrel, however, cannot be withdrawn until the concrete has solidified sufficiently to retain its shape, and hence tends strongly to adhere to the mandrel throughout its surface area, requiring tremendous pulling forces for withdrawal of the mandrel. Release coating compositions as heretofore proposed, including those above mentioned, have proved of little value in reducing this adherence.

We have, however, evolved a release coating composition which has proved highly effective for such and related applications, and such that adherence between the solidified concrete shell and the mandrel is substantially nil, permitting the mandrel to be easily withdrawn, and leaving the shell interior with a smooth surface, free from flaws and unchanged as to the ultimate chemical or physical structure as compared to the concrete in the remainder of the shell.

The release coating composition of our invention comprises the reaction product in boiling water of polyvinyl alcohol (PVA) and the lignitic waste from sulphite paper manufacture. This lignitic waste is essentially sulphonated lignin or more specifically a calcium-ligno-sulphonate complex. A suitable grade of polyvinyl alcohol is one having a viscosity of 24–28 centipoises, a hydrolysis of 99.85% plus, a pH of 5.5–7.5, with volatiles of 5% maximum and ash of 2% maximum.

The preferred proportions of the make-up are about 50 grams by weight of dry PVA, and 100 grams of lignin complex to 500 grams of water. Tests have been conducted to establish the operative limits within which these proportions may be varied. These tests have shown that the most critical component of the make-up is the PVA concentration, due to its effect upon resulting viscosity. Where the PVA concentration is less than 6.25% (weight of dry PVA to total weight of solution), the mixture is incapable of supporting itself on a form; and will simply run off carrying the lignin with it, so that no concrete release characteristics are obtained. Where, on the other hand, the PVA concentration exceeds 12% the mixture becomes so jelly-like that it is incapable of being spread on the form.

Thus, compositions according to the present invention include 40–75 parts by weight PVA and 100–50 parts by weight of the lignin complex to 500 parts by weight of water.

The procedure for making the coating composition of the invention is to heat the water to boiling and then add the lignin complex which apparently goes into solution or into extremely finely comminuted suspension. After solution or suspension of the lignin complex is complete, the day PVA is added which also appears to go into solution or finely dispersed suspension. Applicants have been unable to determine whether or not a true chemical reaction is here involved; however, the PVA may be added first, or dry PVA is added which also appears to go into solution and then added to the solution simultaneously.

In the coating composition as thus produced, the lignin complex appears to act as a retarder which slows up the hardening of the concrete at the mold-concrete interface, thereby to prevent a bond between the concrete and the mold. A satisfactory film coating cannot, however, be obtained with this constituent alone in aqueous medium. Hence it was found necessary to incorporate therewith a suitable film forming carrier to dissolve or suspend the retarder in order to distribute the retarder in the concrete, for which purpose the PVA proved highly effective as the film forming agent.

The release coating composition produced as above may be applied to the metal, wood, plastic or other mold surfaces by brushing, spraying or rolling techniques. The exact action of the so-coated material is not completely understood. Observations have established, however, that essentially what happens is that a continuous dry film is obtained on the mold surface which becomes soft, elastic and slick upon contact with the wet concrete. This film then acts as a lubricating and separating layer between the concrete and mold and permits a ready separation. The film separates from both mold and concrete and either is brought to the surface along with the mandrel as applied to the production of a cast-in-place concrete shell or, alternatively, falls to the bottom of the hole in the concrete.

There does, however, appear to be a reaction between the coating material and the concrete. This reaction creates a water insoluble, continuous film which is soft, elastic and slick to the touch. These characteristics then allow the film to act as a lubricating layer between the concrete and metal.

The invention resides in the selection and combination of the two ingredients for the coating material. Neither the retarder or film former will provide a satisfactory separation by itself. Together they provide complementary functions and accomplish the desired releasing action.

By way of illustrating the invention as applied to the placement in the ground of a cast-in-place concrete shell, reference will now be had to the annexed drawing wherein:

FIGURE 1 is a view in axial sectional elevation of a pile driving assembly being driven into the ground, and comprising an outer tubular casing, a centrally disposed mandrel, disposed on a boot plate together with a driving head, the mandrel having been precoated with the release coating composition of the invention. FIGURE 2 is a similar view after completion of the driving with the driving head removed and showing the filling of the annular space between the mandrel and the casing with liquid concrete. FIGURE 3 is a similar view but showing the casing in the process of being withdrawn while the concrete remains liquid. FIGURE 4 is a similar view but with the casing fully withdrawn and after the concrete has hardened and set, showing the withdrawal of the centrally disposed mandrel.

Referring to FIG. 1, the outer tubular steel casing 10 and centrally disposed mandrel 11 of substantially smaller diameter, are mounted on a boot plate or driving point 12, and the assembly driven into the ground 13 by means of a driving head 14 surmounting the casing. The mandrel, as stated, has been precoated with the aforesaid lignopolyvinyl alcohol coating composition of the invention, as indicated at 12a. Referring to FIG. 2, upon completion of the driving, the driving head 14 is withdrawn, and the annular space between the casing 10 and mandrel 11 is filled with liquid concrete, as at 15, supplied thereto from a grout line 16 extending to the top of the casing as shown. Referring to FIG. 3, after the annular space between the casing 10 and mandrel 11 has been filled with liquid concrete 15 substantially to the ground line 17 as shown, the casing 10 is withdrawn, allowing the liquid concrete to flow against the surrounding earth 13 as at 18. Referring to FIG. 4, after the tubular concrete shell 15 has hardened and set, the mandrel 11 is withdrawn as shown, to leave in the ground 13 the now fully hardened and cast-in-place concrete shell resting on the booth plate 12. As above explained, the release coating composition 12a permits of easy withdrawal of the mandrel without appreciable adherence to the hardened concrete shell.

Tests have shown that the PVA concentration in addition to controlling the viscosity of the composition also directly affects the thickness of the resulting film. Thus where, as above described, pile forms are used, a relatively large concentration of the PVA should be employed. This is because the pile forms are removed, not by backing them off the concrete surface, but instead by sliding them up along the concrete surface of the pile. Accordingly a relatively thick lubricating film (formed by the high PV concentration), is needed. Where, on the other hand, the concrete forms are of the type which can be removed by backing them off the formed concrete surface, then the thick lubricating film is not required. In such case the PVA operates primarily to maintain viscosity, so that the lignin complex will remain in suspension and will be distributed over the concrete.

Tests have also shown that the lignin concentration affects the viscosity of the overall composition only slightly; and that its primary effect is to control the duration of hardening of the portion of the concrete with which it is in direct contact.

It has been possible, by means of the present invention, to produce unusual textured effects upon concrete surfaces. This is achieved by controlling the lignin concentration so that a preselected amount of curing retardation is achieved. Thereafter, forms are arranged with the composition spread thereon and concrete is poured into the forms. The forms are held in place until the concrete is basically set. At this point the forms are removed. The portion of the poured concrete which was immediately adjacent the forms is not fully hardened at this point due to the retardation effect of the lignin. The concrete surface is then hosed down with water which washes away the unhardened cement and unsecured stone, gravel and sand portions near the surface. As a result the remaining surface will take on a textured appearance caused by the exposed portions of stones and gravel held in place by the inner regions of the concrete unaffected by the retarding action of the lignin complex.

This last described technique is made practical through the composition of the present invention for the composition, while containing lignin, a known staining agent, does not stain the concrete. This is because the film which results from the use of the composition in addition to performing as a releasing and lubricating agent, also serves to pull off from the concrete all lignitic material so that a clean concrete surface is produced.

According to a further feature of the invention the release coating is made even more effective by using the composition as a vehicle to support finely produced aluminum. The aluminum is thus held in intimate contact with the concrete and reacts with the concrete during the hardening thereof to evolve hydrogen gas. This gas expands and serves to enhance the separating characteristics of the composition so that the form may be even more readily removed from the concrete surface. It has been found that about 20–100 grams of finely ground aluminum powder mixed thoroughly into the above described release compositions will operate to provide this additional release function in a satisfactory manner.

What is claimed is:

1. A coating composition consisting essentially of the reaction product in boiling water of polyvinyl alcohol and lignitic waste material in the proportions of about 40–75 grams (dry weight) of said alcohol and 50–100 grams of said waste material per 500 grams of water.

2. A coating composition as in claim 1 wherein said lignitic waste material is waste material from the sulphite paper process.

3. A coating composition as in claim 1 wherein said lignitic waste material comprises sulphonated lignin.

4. A coating composition as in claim 1 wherein said lignitic waste material is calcium-ligno-sulphonate.

5. A coating composition as in claim 1 wherein said polyvinyl alcohol is present in a concentration between 6.25 and 12 percent of the total weight of the composition.

6. A coating composition as in claim 1 wherein said composition consists essentially of 50 grams of said polyvinyl alcohol and 100 grams of said lignitic waste material for each 500 grams of water.

7. A coating composition as in claim 1 wherein said composition includes aluminum material.

8. A coating composition as in claim 1 wherein said composition includes finely divided aluminum powder.

9. A coating composition as in claim 1 wherein said composition includes from 20–100 grams of finely divided aluminum powder per 500 grams of water.

References Cited

UNITED STATES PATENTS

| | | | |
|---|---|---|---|
| 2,579,481 | 12/1951 | Fenn | 260—17.5 |
| 2,954,353 | 9/1960 | Bruce et al. | 260—17.5 |
| 3,115,414 | 12/1963 | Lottridgs et al. | 106—38.23 |
| 3,198,640 | 8/1965 | Walsh et al. | 106—38.3 |
| 3,144,690 | 8/1964 | Buckingham | 106—38.9 |

FOREIGN PATENTS 633,710  12/1949  Great Britain.

WILLIAM H. SHORT, *Primary Examiner.*

J. NORRIS, *Assistant Examiner.*

UNITED STATES PATENT OFFICE
CERTIFICATE OF CORRECTION

Patent No. 3,376,240 April 2, 1968

Rboert W. Childers et al.

It is certified that error appears in the above identified patent and that said Letters Patent are hereby corrected as shown below:

Column 2, lines 63 and 64, "or dry PVA is added which also appears to go into solution" should read -- or the PVA and lignin solids may be first mixed together --. Column 4, line 15, "PV" should read -- PVA --. Column 5, line 2, "comprises" should read -- is --.

Signed and sealed this 12th day of August 1969.

(SEAL)
Attest:

Edward M. Fletcher, Jr.
Attesting Officer

WILLIAM E. SCHUYLER, JR.
Commissioner of Patents